United States Patent
Kirshenbaum et al.

(10) Patent No.: US 6,889,169 B2
(45) Date of Patent: May 3, 2005

(54) COLLECTION OF SESSION-RELATED INFORMATION USING AN EXTENDABLE SAMPLING PERIOD

(75) Inventors: Evan Kirshenbaum, Mountain View, CA (US); Deborah A. Lienhart, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 10/356,409

(22) Filed: Jan. 31, 2003

(65) Prior Publication Data

US 2004/0153287 A1 Aug. 5, 2004

(51) Int. Cl.⁷ .............................................. G06F 19/00
(52) U.S. Cl. ...................... 702/187; 702/186; 709/223; 709/224
(58) Field of Search ................................ 702/186, 187; 709/223, 224, 203, 244

(56) References Cited

U.S. PATENT DOCUMENTS

| | | | |
|---|---|---|---|
| 6,041,041 A | * | 3/2000 | Ramanathan et al. ....... 370/241 |
| 6,446,119 B1 | | 9/2002 | Olah et al. |
| 6,606,619 B2 | * | 8/2003 | Ortega et al. ................... 707/2 |
| 6,763,380 B1 | * | 7/2004 | Mayton et al. .............. 709/224 |
| 2002/0047859 A1 | * | 4/2002 | Szlam et al. ................. 345/705 |
| 2003/0131098 A1 | * | 7/2003 | Huntington et al. ........ 709/224 |
| 2003/0135525 A1 | * | 7/2003 | Huntington et al. ..... 707/501.1 |
| 2003/0187617 A1 | * | 10/2003 | Murphy et al. ............. 702/186 |
| 2003/0225905 A1 | * | 12/2003 | Scifres et al. ............... 709/234 |
| 2004/0008763 A1 | * | 1/2004 | Fredriksson ................ 375/224 |
| 2004/0059544 A1 | * | 3/2004 | Smocha et al. ............. 702/182 |
| 2004/0068560 A1 | * | 4/2004 | Oulu et al. .................. 709/224 |
| 2004/0088406 A1 | * | 5/2004 | Corley et al. ............... 709/224 |
| 2004/0133395 A1 | * | 7/2004 | Ding et al. .................. 702/182 |

FOREIGN PATENT DOCUMENTS

| | | |
|---|---|---|
| JP | 2002091852 | 3/2002 |
| WO | WO 00/75814 | 12/2000 |
| WO | WO 02/48902 | 6/2002 |

* cited by examiner

Primary Examiner—Patrick Assouad

(57) ABSTRACT

Methods and systems for collecting session-related information used for evaluating an event are described. A session is conducted between a server and a client device. The session includes client interaction with a Web site. Selected information corresponding to the session is collected and stored. The information is collected over a sliding sampling period. The sampling period has a length measured from a start time that moves forward in time as the session is extended. The start time is anchored upon identification of an event, such that the sampling period is extended in length following the event.

27 Claims, 2 Drawing Sheets

COLLECTION OF SESSION-RELATED INFORMATION USING AN EXTENDABLE SAMPLING PERIOD

TECHNICAL FIELD

Embodiments of the present invention generally relate to client-server systems. More specifically, embodiments of the present invention relate to management of Web services.

BACKGROUND ART

A user at a client or remote device may access a Web site residing on a server. Once the Web site has been accessed and the associated Web page rendered for display, the user will generally interact with the Web site on many different levels.

First, the user interacts at a visceral level. The speed at which the Web page is rendered will make an initial impression on the user. The layout of the Web page, its graphics and animation, and other visual characteristics of the display will contribute to this initial impression.

Other features of the Web site/page will similarly elicit further impressions. The ease of navigation, the number of choices presented to the user, the speed at which other Web pages can be found and displayed, and other such factors can contribute to either a favorable or unfavorable experience for the user.

Providers of Web services desire that the user experience be favorable, of course, so that the user will continue his or her session to a fruitful outcome. For example, a company that sells items over the Internet wants the user to complete the session with the purchase of an item. A Web site that frustrates the user in some way may cause the user to abandon the session before a purchase is made. In other words, a Web service provider wants to enhance the user experience to the extent practicable, to provide as smooth a path as possible and thus increase the likelihood of a sale.

To help accomplish this, it is important to identify the obstacles that lie between the user and a favorable experience; once identified, they can be addressed. Currently, techniques have been developed for identifying when a user is having a problem or for identifying that a problem (generally, an "event") has occurred. Other techniques have been developed for diagnosing the problem and for proffering solutions.

However, the prior art is lacking with regard to the information that is available for use by the diagnostic tools. At times, information needed for a proper diagnosis is not available or is insufficient. In some instances, attempts are made to recreate the circumstances that existed when the event occurred. In general, without sufficient information, it is difficult to accurately identify a proper solution that will correct the problem or mitigate the consequences.

DISCLOSURE OF THE INVENTION

Embodiments of the present invention pertain to methods and systems for collecting session-related information used for evaluating an event. In one embodiment, a session is conducted between a server and a client device. The session includes client interaction with a Web site. Selected information corresponding to the session is collected and stored. The information is collected over a sliding sampling period. The sampling period has a length measured from a start time that moves forward in time as the session is extended. The start time is anchored upon identification of an event, such that the length of the sampling period is extended following the event.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
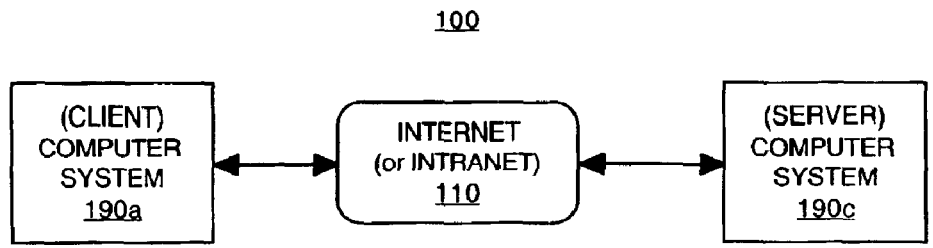
FIG. 1 is a block diagram illustrating an exemplary network of communicatively coupled devices upon which embodiments of the present invention may be practiced.

FIG. 1 is a block diagram of computer systems 190a and 190c coupled in an exemplary network 100 upon which embodiments of the present invention can be implemented. The computer systems 190a (e.g., a client) and 190c (e.g., a server) can be physically in separate locations (e.g., remotely separated from each other). It is appreciated that the present invention can be utilized with any number of computer systems. For example, computer system 190c can be part of a server farm. In addition, there can be any number of clients in communication with computer system 190c.

Computer systems 190a and 190c include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. These computer systems may also include an input/output device for providing a physical communication link between the computer system and a network, using either a wired or a wireless communication interface.

Network 100 may represent a portion of a communication network located within a firewall of an organization or corporation (an "intranet"), or network 100 may represent a portion of the World Wide Web or Internet 110. The mechanisms for coupling computer systems 190a and 190c over the Internet (or Intranet) 110 are well known in the art. In the present embodiment, standard Internet protocols like IP (Internet Protocol), TCP (Transmission Control Protocol), HTTP (HyperText Transfer Protocol) and SSL (Secure Sockets Layer) are used to transport data between clients and servers, in either direction. However, the coupling of computer systems 190a and 190c can be accomplished over any network protocol that supports a network connection, including NetBIOS, IPX (Internet Packet Exchange), and LU6.2, and link layers protocols such as Ethernet, token ring, and ATM (Asynchronous Transfer Mode). Computer systems 190a and 190c may also be coupled via their respective input/output ports (e.g., serial ports) or via wireless connections (e.g., according to IEEE 802.11b).

Figure 2A:
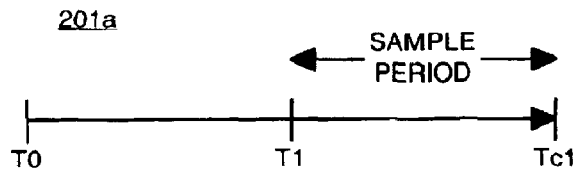
FIGS. 2A, 2B and 2C are illustrations of session timelines according to one embodiment of the present invention.
Figure 2B:
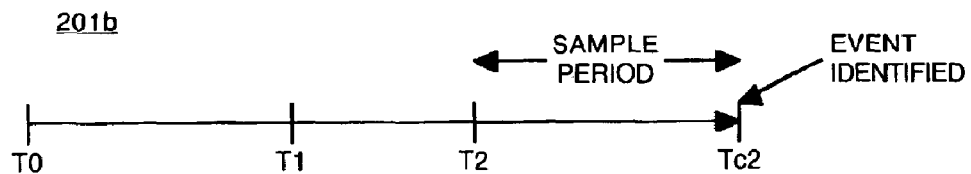
Figure 2C:
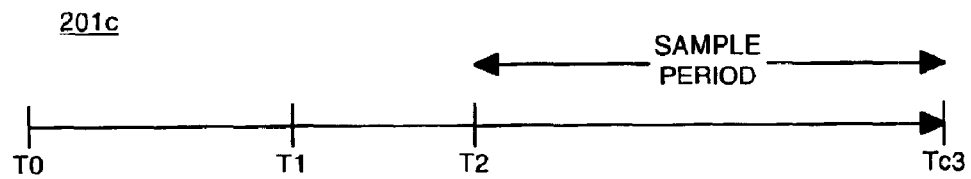

FIGS. 2A, 2B and 2C illustrate exemplary session timelines 201a, 201b, and 201c, respectively, according to one embodiment of the present invention. A session typically refers to the time in which a user, situated at a client device, interacts with a Web site residing on a server device. Generally, a Web site includes a home page and other linked pages. The linked pages may include a page or pages from another Web site.

However, for the purposes of the present invention, a session may be broadly or narrowly defined. In other words, embodiments of the present invention pertain to methods, and systems thereof, for collecting session-related information. It can be left up to the Web site provider how a session is to be defined.

In some instances, a session is not continuous in time. For example, a cookie may be loaded onto a user (client) device during interaction with a particular Web site. As long as the cookie is resident on the user's device, the client device will maintain some memory of the session. The cookie in essence allows the session to pick up where it left off, effecting an apparently continuous session even when the session is not continuous in time. Thus, although FIGS. 2A, 2B and 2C show a continuous timeline, it is understood that there may actually be some discontinuities in time during a session.

With reference first to FIG. 2A, a session is initiated at time T0 on timeline 201a. The current instant in time relative to the session is shown as time Tc1. That is, Tc1 is the present time, referenced to the user.

According to the present embodiment, a sample period is specified, during which selected information is monitored and perhaps recorded and stored during the session. Generally, the process by which information is monitored and recorded can be referred to as sampling. During the sample period, sampling can occur as a relatively continuous trace of the parameter being monitored, or sampling can be performed at periodic intervals.

In the present embodiment, information collected outside of the sample period (that is, before time T1) is discarded or overwritten in memory. In one such embodiment, the information is stored in a rolling buffer, in which only the most recent information (as measured by the length of the sample period) is kept.

Note that the information selected for monitoring and the information selected for recording and/or storage may be different. That is, the information selected for recording and/or storage can be a subset of the information selected for monitoring.

Note also that information can be monitored and collected by the server, and/or the information can be monitored and collected by the client and provided to the server. This is described further in conjunction with FIGS. 3 and 4, respectively. The information can also be monitored at some processing element, such as a proxy, firewall, or router, along the communication path between the client and the server.

As will be seen, according to embodiments of the present invention, the information selected for monitoring and the information selected for recording can be changed in some way in response to the detection of some type of event that occurs during the session. That is, for example, the type of information that is monitored, or the frequency at which the information is sampled and/or recorded, can be changed upon detecting the occurrence of an event. If the event is detected on the server, the server can change its information collection behavior. If the client has the capability for information collection, the server can notify the client of the event, which in turn can change its information collection behavior. If the event is detected on the client, the client can notify the server of the event, which in turn can change its information collection behavior; and, if the client has the capability for information collection, it can also change its information collection behavior.

The information selected for monitoring can include any kind of information that is of specific interest to the Web site provider. In particular, the information selected for monitoring is of the type that can aid in the evaluation and diagnosis of any problem or event that may arise during the session. The information can be derived from but is not limited to the following:

the requests received from the client;

the server actions in response to the client requests;

the server responses to client requests;

requests from the server to the client (which may be invisible to the user);

the client response to the server requests; and actions performed on and/or at the client, either in response to a server request, or not (e.g., actions performed independently of the server).

As noted above, the information can be collected by the server, and/or collected by the client (e.g., by a Web browser on the client) and provided to the server. The type of information available for monitoring and collection is dependent on whether the server or the client is performing these functions. With that in mind, the type of information selected for monitoring includes but is not limited to:

information requested by the client;

the kind of application (e.g., Web browser) used by the client;

attributes of the client device such as processor and display capabilities;

the time of day;

other Web sites or Web pages visited by the client/user;

interactions on the client with other client-based applications;

the bandwidth of the connection between the server and the client;

roundtrip time on requests from the client to the server, and vice versa;

the time between successive "page clicks;"

other types of mouse movements;

information included in the headers of the requests received from the client (e.g., in a Transmission Control Protocol environment);

the program code of the Web page sent to the client;

the sizes of the Web pages provided to the client;

other attributes of the Web pages sent to the client, such as whether they contained animation, the number of colors in the color maps of the pages, and the like; and the complexity of the page, such as the number of options or selections presented to the user.

Continuing with reference to FIG. 2A, the sample period is generally fixed in length except, as will be seen, upon the occurrence of an event. In the present embodiment, the sample period has a length extending from time Tc1 back to time T1. The length of the sample period may be different on a per-session or a per-user basis, for example. The length of the sample period on a client may be different from the sample period on a server.

With reference next to FIG. 2B, as the session continues, the sample period moves forward in time as well. As such, the sample period is referred to as a sliding sample period, or a sliding or moving window of time.

In timeline 201b, Tc2 is the present time, referenced to the user. The sample period maintains its fixed length, measured from time Tc2 back to time T2. That is, the difference between Tc2 and T2 is the same as the difference between Tc1 and T1 of FIG. 2A. Information collected outside of the sample period (e.g., before time T2) can be discarded or overwritten in memory.

Continuing with reference to FIG. 2B, an event is shown as occurring at time Tc2. Generally, an event refers to any kind of occurrence or problem experienced by the user or client device. An event can include an individual customer (user) satisfaction issue, or a systemic issue that affects multiple users. Symptoms or signs of a customer satisfaction issue include, but are not limited to:

selecting the "back" button of the Web browser;

not selecting one of the top items listed in response to a search request;

removing items from a "shopping cart" associated with the session or Web site;

stopping the download of a Web page;

exiting from a Web site at a location not typically exited from in comparison to other users;

selecting a "panic button" on the Web browser (e.g., a key or a graphical element specifically designated as an event alert); and noticing that the user's emotional state, inferred by physically monitoring the user or the user's environment, has crossed a threshold.

As can be seen from FIG. 2B, information is monitored for a period of time before the event is detected, and at least a subset of that information (if not all of that information) is retained. Accordingly, that information, as well as other information collected after the event is detected, is available for evaluation and diagnosis of the event.

With reference now to FIG. 2C, in response to an event being detected, the starting point of the sample period is fixed in time. With reference also to FIG. 2B, the start point of the sample period was at time T2 when the event was detected. Accordingly, in the present embodiment, the start of the sample period is anchored at time T2. The start point of the sample period remains anchored (fixed) as the session continues to Tc3 and beyond, and therefore the length of the sample period is extended as the session continues. In timeline 201c, Tc3 is the present time, referenced to the user.

In the embodiment of FIG. 2C, the sample period extends indefinitely as the session continues. However, in one embodiment, a maximum length for the sample period is specified. In another embodiment, the length of the sample period is extended until another sign is generated by the user (client), in particular a more favorable sign. For example, adding or returning items to the shopping cart can be used to restore the sample period to its pre-event length. Other signs, including signs suggested by the discussion above (those signs symptomatic of a customer satisfaction issue), can be used. However, should the second sign be an indicator of a customer satisfaction issue, the extended sample period can continue to be used.

Figure 3:
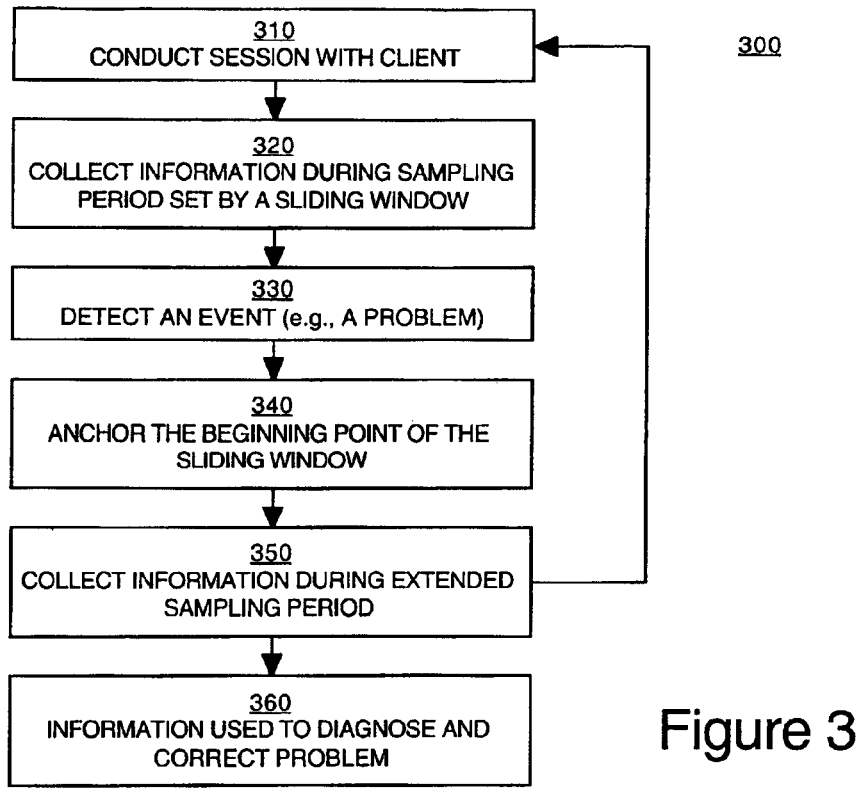
FIG. 3 is a flowchart of a server-side method for collecting session-related information according to one embodiment of the present invention.
Figure 4:
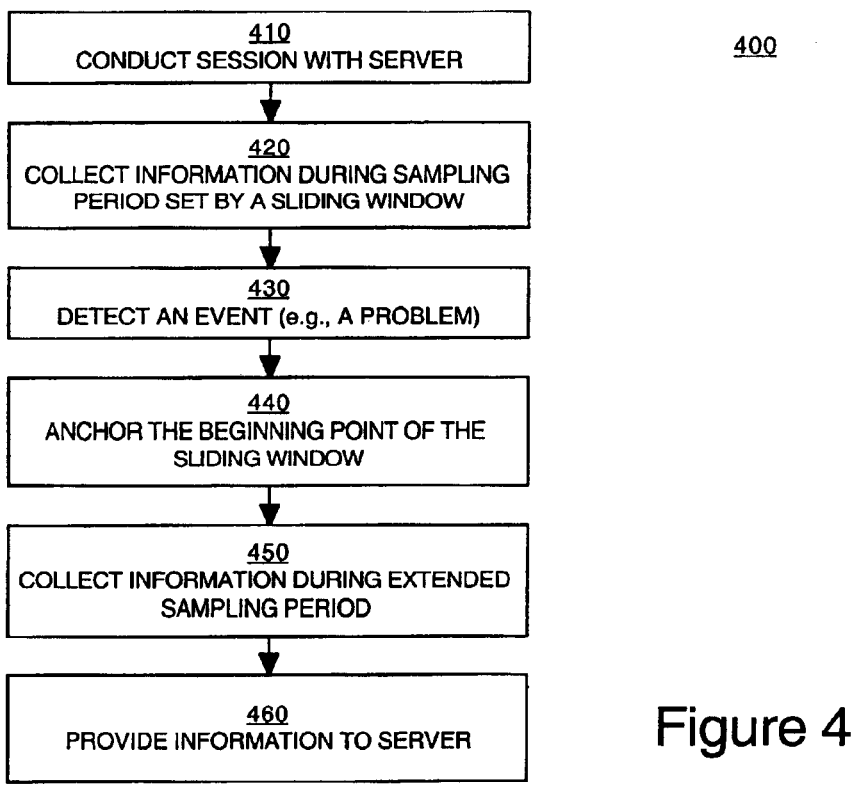
FIG. 4 is a flowchart of a client-side method for collecting session-related information according to one embodiment of the present invention.

The use of a sliding sample period in practice is further described in conjunction with FIGS. 3 and 4. FIG. 3 is a flowchart 300 of a server-side method for collecting session-related information according to one embodiment of the present invention. FIG. 4 is a flowchart 400 of a client-side method for collecting session-related information according to one embodiment of the present invention.

Although specific steps are disclosed in flowcharts 300 and 400, such steps are exemplary. That is, embodiments of the present invention are well suited to performing various other steps or variations of the steps recited in flowcharts 300 and 400. It is appreciated that the steps in flowcharts 300 and 400 may be performed in an order different than presented, and that not all of the steps in flowcharts 300 and 400 may be performed. All of, or a portion of, the methods described by flowcharts 300 and 400 may be implemented using computer-readable and computer-executable instructions which reside, for example, in computer-usable media of a computer system or like device. Generally, flowchart 300 is implemented by devices such as server 190c of FIG. 1, and flowchart 400 is implemented by devices such as client 190a of FIG. 1.

Looking first at FIG. 3, in block 310 of the present embodiment, a session with a client device is initiated and conducted.

In block 320, information is collected during a sample period that is set by a sliding window of time, as described above. Mention is also made above of some of the types of information that can be collected.

In block 330, an event is detected. Some of the types of events that can be detected are mentioned above. An event in another session (e.g., a similar session being conducted with another client/user) might also be used as a trigger. In one embodiment, upon detecting an event, the server notifies the client of the event; the client response is described in conjunction with FIG. 4, below. In another embodiment, the client identifies that an event has occurred, and notifies the server.

In block 340, according to the present embodiment of the present invention, the beginning point of the sliding window is anchored once the event has been detected. Events such as those described above are detectable by a server system.

In block 350, information continues to be collected during the extended sample period. By itself, extension of the sample period means more information is available for evaluation and diagnosis of the event. However, the event can also trigger other actions in addition to extension of the sample period. In one embodiment, additional information is collected, recorded and stored. That is, for example, prior to the event, only a subset of the information that could be monitored may be monitored; however, upon detection of the event and extension of the sample period, the complete set of information can be monitored. Similarly, prior to the event, only a subset of the information that was collected may have been stored. Subsequent to the event, a greater amount (e.g., all) of the collected information can be stored.

In another embodiment, upon detecting an event, the information is collected at an increased level of granularity (in greater detail). For example, the frequency at which information is sampled and recorded can be increased. It is appreciated that different traces of information can be sampled and recorded at different granularities. That is, some information can be sampled and recorded at one frequency, while other information is sampled and recorded at a different frequency.

In addition to the above, other actions can be performed in response to detection of an event. As mentioned above, signs that are symptomatic of different kinds of events can be detected and identified. An appropriate response can be defined for each sign. The appropriate response is then enacted upon identifying the type of event.

For example, the appropriate response may be to continue collecting information until a second event (e.g., another sign) occurs. The second sign may be a user action, the elapse of a specified period of time, or some other type of event.

Another type of response is to perform an immediate action. For example, upon detecting that a user is repeatedly stopping the download of Web pages, a pop-up dialogue box can be generated on the client device that might inquire whether the user would prefer fewer graphics or less animation, for the ongoing session as well as for future sessions. As another example, upon detecting that a user is having trouble locating a particular item using a search capability, a dialogue box offering additional assistance or contact with a customer service representative can be generated. In this manner, customer satisfaction can be improved within the ongoing session.

An event is not necessarily associated with a negative (or potentially negative) customer experience. For example, upon receipt of a relatively large order (possibly measured against some threshold dollar amount), the starting point of the sliding sample period may be anchored and an increased level of information collected. The information that is collected can be provided to a diagnostic tool, which can evaluate that information on-the-fly (in real time, concurrent with the ongoing session) to identify potential problems and even likely solutions, based perhaps on prior evaluations of similar types of information. For example, if server response time is slowing during a peak period of activity, then priority might be given to the higher-value order, with another order deferred for a short period of time until more resources become available. In this respect, the anchoring and extension of the sliding time window can be viewed as a proactive measure intended to facilitate the successful completion of a transaction, instead of as a responsive measure.

In general, the examples above illustrate that other types of appropriate responses to an event can include changing system behavior and/or performing a real-time analysis of the event.

Continuing with reference to FIG. 3, in block 360, information that has been monitored and recorded during the sliding sample period can be saved for later diagnosis, or forwarded immediately to a diagnostic tool for evaluation. The diagnostic tool may reside on the server that conducted the session or on another computer system. The session can be individually evaluated, and information from other sessions can be evaluated in aggregate.

With reference now to FIG. 4, in block 410 of the present embodiment, a session with a server device is initiated and conducted.

In block 420, information is collected during a sample period that is set by a sliding window of time, as described above. Mention is also made above of some of the types of information that can be collected.

In block 430, an event is detected. Some of the types of events that can be detected are mentioned above. In one embodiment, the client identifies that an event has occurred, and notifies the server. In another embodiment, upon detecting an event, the server notifies the client of the event.

In block 440, according to the present embodiment of the present invention, the beginning point of the sliding window is anchored once the event has been detected.

In block 450, information continues to be collected during the extended sample period, in a manner similar to that described above (refer to the discussion of block 350 of FIG. 3).

The extended sample period can continue for a predetermined period of time, or it may continue until another user action is performed. Other types of events can be used to cause the end of the extended sample period. For example, a signal from the server can be used to end the extended sample period on the client.

In block 460, the information that has been collected is provided to the server. The information can be included in the header of a request for a Web page or by some other mechanism. The information can be automatically provided to the server, or provided in response to a request from the server. As described in block 360 of FIG. 3, information that has been monitored and collected (by the client as well as the server) can be used for diagnosis of the event.

In summary, embodiments of the present invention provide methods and systems thereof that strike a proper balance between collecting enough session information to allow proper diagnosis of a customer satisfaction issue, against collecting too much information that might impact system performance. The use of a sliding sample period makes efficient use of storage and computing resources, ensuring that sufficient information is obtained and/or kept for evaluation, but eliminating information not likely to be of use.

Various embodiments of the present invention are thus described. While the present invention has been described in particular embodiments, it should be appreciated that the present invention should not be construed as limited by such embodiments, but rather construed according to the following claims.

What is claimed is:

1. A method of collecting session-related information used for evaluating an event, said method comprising:
   conducting a session between a server and a client device, said session comprising client interaction with a Web site;
   collecting and storing selected information corresponding to said session, said information collected over a sliding sampling period, said sampling period having a length measured from a start time that moves forward in time as said session is extended; and
   anchoring said start time upon identification of an event such that said sampling period is extended in length following said event.

2. The method of claim 1 further comprising:
   discarding information collected at a point in time no longer within said sampling period.

3. The method of claim 1 further comprising:
   collecting and storing information in addition to said selected information upon said anchoring of said start time.

4. The method of claim 1 further comprising:
collecting and storing said information at a higher level of granularity upon said anchoring of said start time.

5. The method of claim 1 further comprising:
correlating collected information to said event.

6. The method of claim 1 further comprising:
adjusting said length of said sampling period during said session and prior to said identification of said event.

7. The method of claim 1 further comprising:
sending collected information to a diagnostic system for evaluation of said event.

8. A server providing a Web service, said server comprising:
a communication link to a client;
a memory unit coupled to said communication link; and
a processor coupled to said memory unit, said processor for executing a method for evaluating an event associated with said Web service, said method comprising:
executing a session with said client, said session pertaining to said Web service;
accumulating a subset of information from a set of available information, said subset acquired over a moving time period, said time period having a length that is measured from a start time that moves forward in time during said session;
identifying an event; and
fixing said start time when said event is identified, wherein said time period for acquiring information is extended in length following said event.

9. The server of claim 8 wherein acquired information is stored in a rolling buffer residing in said memory.

10. The server of claim 8 wherein in response to said fixing of said start time, additional information from said set of available information is acquired.

11. The server of claim 8 wherein in response to said fixing of said start time, information is acquired at an increased level of detail.

12. The server of claim 8 wherein said event and acquired information are indexed to each other.

13. The server of claim 8 wherein said length of said time period is variable during said session.

14. The server of claim 8 wherein said method further comprises:
communicating to said client that said event has been identified.

15. A computer-usable medium having computer-readable program code embodied therein for causing a computer system to perform a method for collecting session-related information, said method comprising:
participating in a session comprising interaction with a Web site;
recording specified information that is associated with said session, said information recorded over a sliding window of time that coincides with the most recent portion of said session, said window having a start time that moves forward with time; and
anchoring said start time upon identification of an event such that said window is extended in length as said session progresses after said event.

16. The computer-usable medium of claim 15 wherein said computer-readable program code embodied therein causes a computer system to perform a method for collecting session-related information, said method comprising:
removing recorded information from memory that was recorded outside of said window.

17. The computer-usable medium of claim 15 wherein said computer-readable program code embodied therein causes a computer system to perform a method for collecting session-related information, said method comprising:
recording information in addition to said specified information upon said anchoring of said start time.

18. The computer-usable medium of claim 15 wherein said computer-readable program code embodied therein causes a computer system to perform a method for collecting session-related information, said method comprising:
recording said information more frequently upon said anchoring of said start time.

19. The computer-usable medium of claim 15 wherein said computer-readable program code embodied therein causes a computer system to perform a method for collecting session-related information, said method comprising:
correlating recorded information to said event.

20. The computer-usable medium of claim 15 wherein said computer-readable program code embodied therein causes a computer system to perform a method for collecting session-related information, said method comprising:
varying a length of said window prior to said identification of said event.

21. The computer-usable medium of claim 15 wherein said computer-readable program code embodied therein causes a computer system to perform a method for collecting session-related information, said method comprising:
evaluating recorded information to diagnose said event.

22. A client device comprising:
a communication link to a server that provides a Web service;
a memory unit coupled to said communication link; and
a processor coupled to said memory unit, said processor for executing a method for evaluating an event associated with said Web service, said method comprising:
executing a session with said server, said session pertaining to said Web service;
accumulating a subset of information from a set of available information, said subset acquired over a moving time period, said time period having a length that is measured from a start time that moves forward in time during said session;
identifying an event; and
fixing said start time when said event is identified, wherein said time period for acquiring information is extended in length following said event.

23. The client device of claim 22 wherein acquired information is stored in a rolling buffer residing in said memory.

24. The client device of claim 22 wherein in response to said fixing of said start time, additional information from said set of available information is acquired.

25. The client device of claim 22 wherein in response to said fixing of said start time, information is acquired at an increased level of detail.

26. The client device of claim 22 wherein said method further comprises:
sending collected information to said server.

27. The client device of claim 22 wherein said method further comprises:
receiving a message from said server that identifies said event has occurred.

* * * * *